(12) United States Patent
Bagnall

(10) Patent No.: US 8,944,007 B2
(45) Date of Patent: Feb. 3, 2015

(54) MEALWORM FEEDER

(75) Inventor: Gary Wayne Bagnall, Arroyo Grande, CA (US)

(73) Assignee: Zoo Med Laboratories, Inc., San Luis Obispo, CA (US)

( * ) Notice: Subject to any disclaimer, the term of this patent is extended or adjusted under 35 U.S.C. 154(b) by 222 days.

(21) Appl. No.: 13/455,676

(22) Filed: Apr. 25, 2012

(65) Prior Publication Data

US 2013/0284101 A1   Oct. 31, 2013

(51) Int. Cl.
*A01K 5/01*   (2006.01)

(52) U.S. Cl.
USPC .......................... 119/61.57; 119/61.5; 119/53

(58) Field of Classification Search
CPC .............................. A01K 1/0356; A01K 39/01
USPC ........ 119/51.01, 53, 61.31, 61.5, 61.57, 56.1, 119/61.2; 220/253, 483, 480; 221/261, 151; 222/180, 181.1, 181.2, 181.3, 189.05, 222/189.03, 142.2, 142.9, 144, 144.5; 248/311.2, 309.2, 205.5
See application file for complete search history.

(56) References Cited

U.S. PATENT DOCUMENTS

| | | | |
|---|---|---|---|
| 2,107,324 A * | 2/1938 | Boyle | 222/429 |
| 2,543,934 A * | 3/1951 | Poskey | 222/370 |
| 3,050,029 A * | 8/1962 | Appleton | 119/51.13 |
| 3,279,430 A | 10/1966 | Mugridge | |
| 4,585,112 A * | 4/1986 | Peeling et al. | 194/293 |
| 4,823,738 A * | 4/1989 | Gold | 119/51.01 |
| 5,738,236 A * | 4/1998 | Brun, Jr. | 220/253 |
| 5,749,490 A * | 5/1998 | Keicher | 220/481 |
| 5,833,194 A * | 11/1998 | Jones et al. | 248/311.2 |
| 5,975,024 A * | 11/1999 | Sheaffer | 119/477 |
| 7,216,785 B1 * | 5/2007 | Meyer et al. | 222/568 |
| 7,651,063 B2 * | 1/2010 | Jensen | 248/206.2 |
| 2002/0069829 A1 | 6/2002 | McMahon | |
| 2005/0051689 A1 * | 3/2005 | Gory | 248/311.2 |
| 2005/0224495 A1 * | 10/2005 | Kartinian | 220/253 |
| 2011/0297093 A1 * | 12/2011 | Lai | 119/54 |

FOREIGN PATENT DOCUMENTS

| | | |
|---|---|---|
| AU | 4349672 | 12/1973 |
| DE | 102004040897 | 3/2006 |
| GB | 1330846 | 9/1973 |
| GB | 752132 | 7/1986 |
| JP | 2007006736 | 1/2007 |

* cited by examiner

*Primary Examiner* — Rob Swiatek
*Assistant Examiner* — Lisa Tsang
(74) *Attorney, Agent, or Firm* — Welsh Flaxman & Gitler LLC

(57) ABSTRACT

The present invention provides a feeding device for amphibians and reptiles that includes a food chamber in the form of a cup with a plurality of feeding holes formed in a bottom thereof. The preferred hole size is approximately 4 mm to accommodate the mealworm. The feeding device is made from transparent plastic allowing reptiles or amphibians sitting beneath the feeding device to see the mealworms contained therein.

10 Claims, 6 Drawing Sheets

MEALWORM FEEDER

BACKGROUND OF THE INVENTION

1. Field of the Invention

The invention relates to a reptile or amphibian feeding device.

2. Description of the Related Art

Reptile or amphibian owners conventionally need to dump their food into a food dish from which the reptile or amphibian may then eat the provided food. However, this does not enhance the reptile or amphibians' confined existence, as it does not replicate the reptile or amphibians' natural environment and feeding habits. As such, it has been determined that a need exists for a reptile or amphibian feeding device allowing reptiles or amphibians to use their instinct to hunt and forage for food by replicating the reptile or amphibians' natural environment and feeding habits.

SUMMARY OF THE INVENTION

It is, therefore, an object of the present invention to provide a feeding device for amphibians and reptiles that includes a food chamber in the form of a cup with a plurality of feeding holes formed in a bottom thereof. The preferred hole size is approximately 4 mm to accommodate the mealworm. In a preferred embodiment, the feeding device is made from transparent plastic allowing reptiles or amphibians sitting beneath the feeding device to see the mealworms contained therein.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

Figure 1:
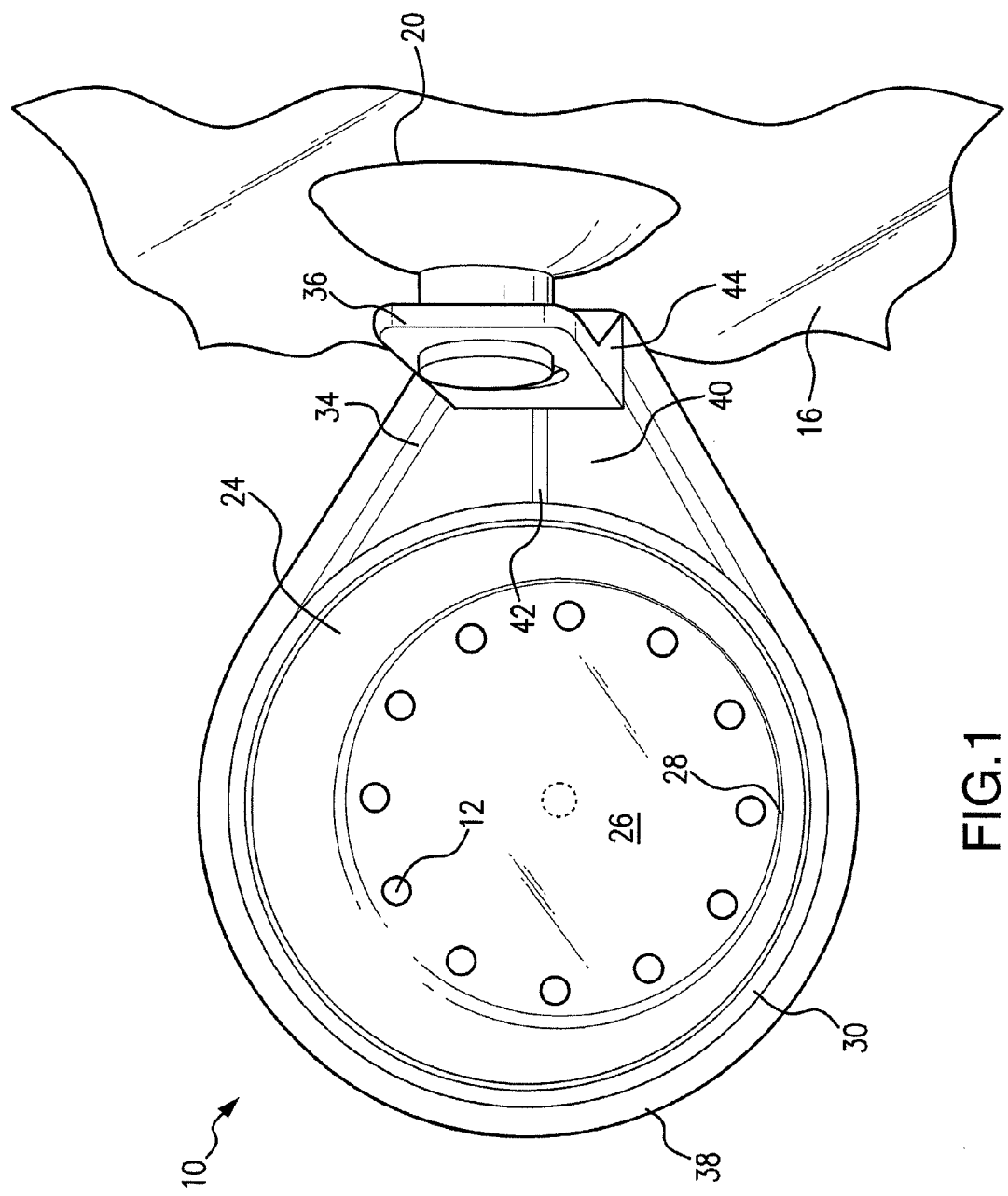
FIG. 1 is a top view of a preferred embodiment of the present feeding device.
Figure 2:
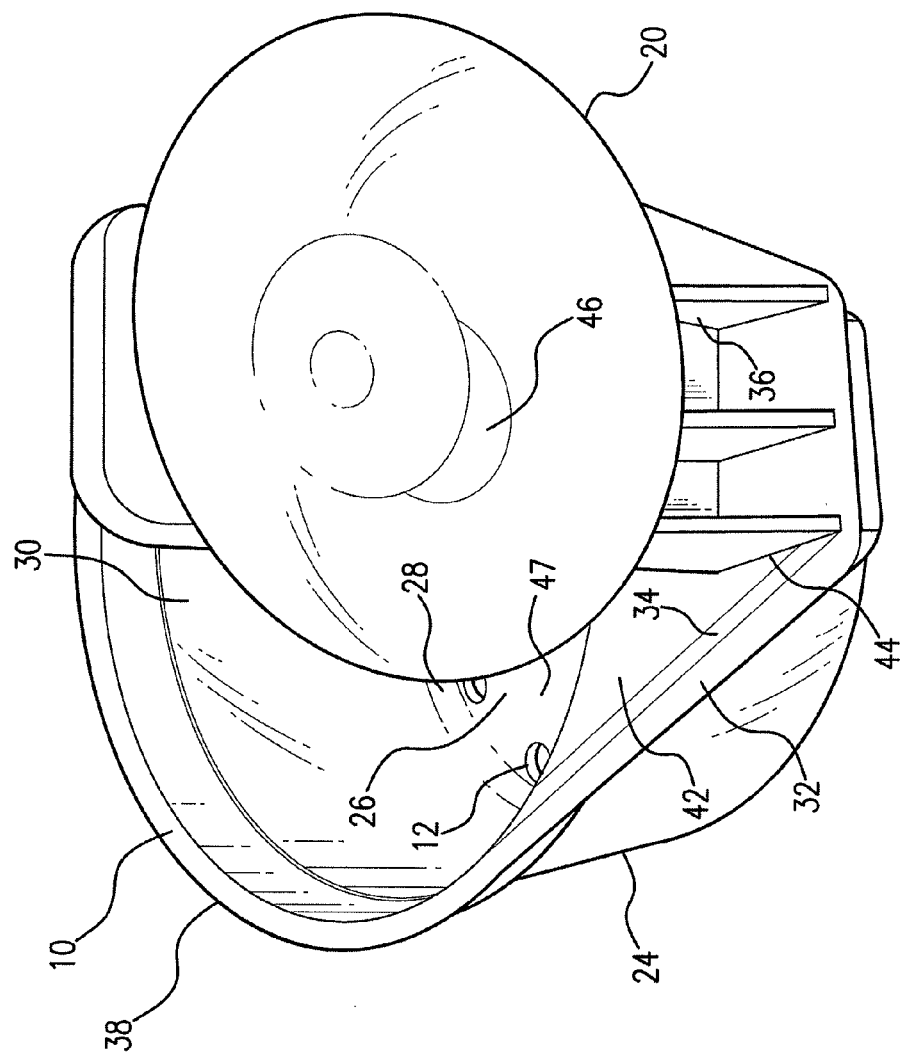
FIG. 2 is a rear perspective view of the feeding device shown in FIG. 1.
Figure 3:
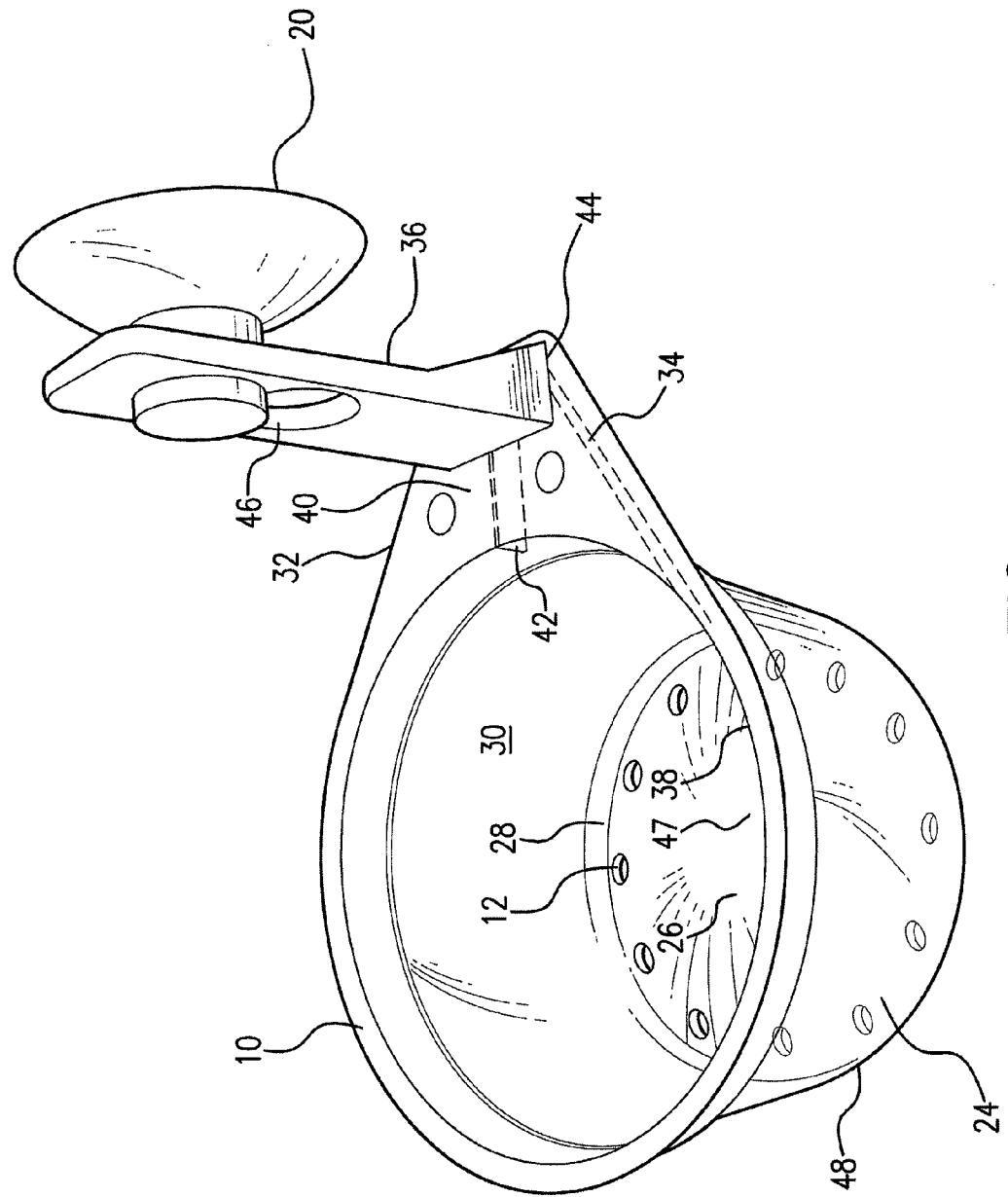
FIG. 3 is a side perspective view of the feeding device shown in FIG. 1.
Figure 4:
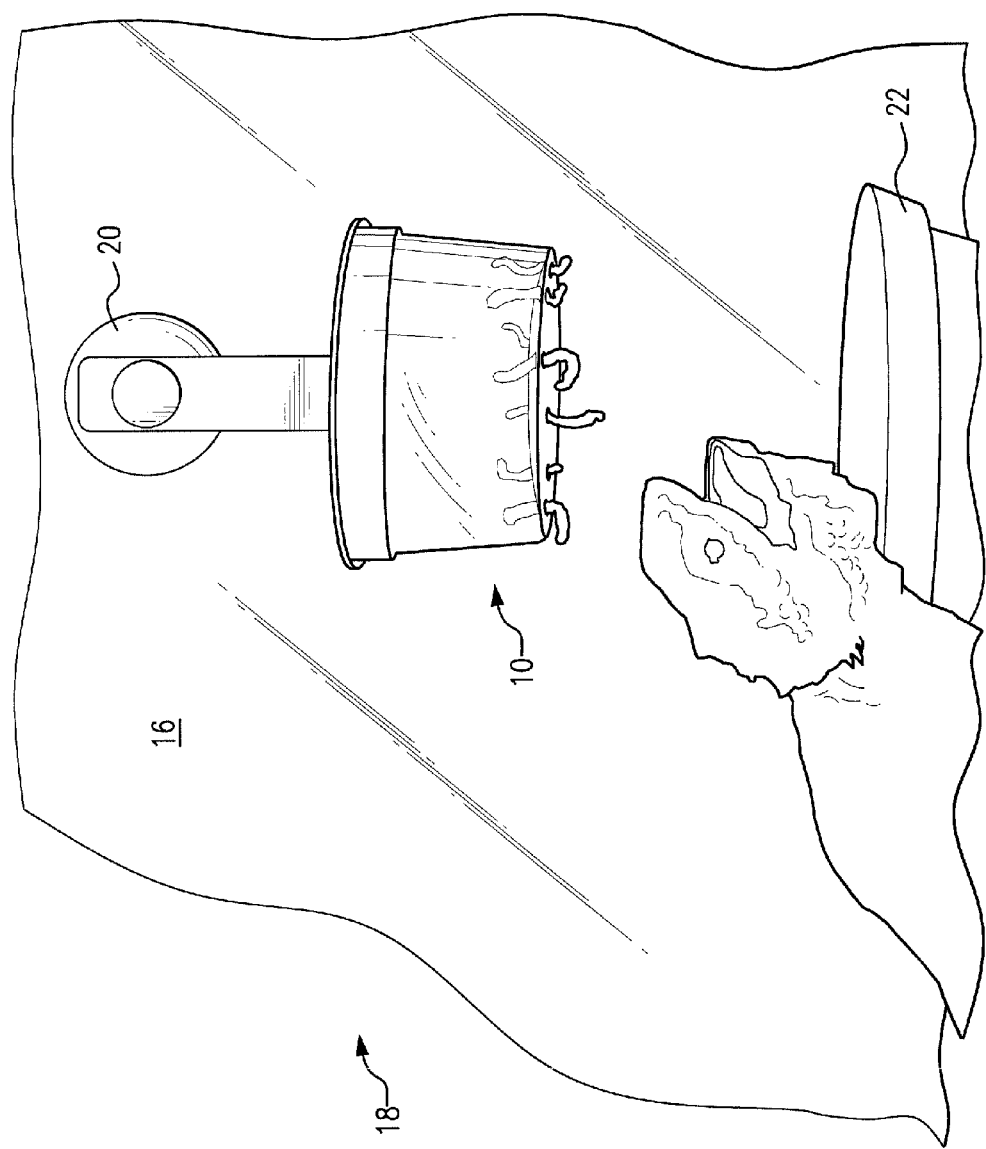
FIG. 4 is a front perspective view of the feeding device shown in FIG. 1 while in use.

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as a basis for teaching one skilled in the art how to make and/or use the invention.

In accordance with the present invention, and with reference to FIGS. 1 to 4, a feeding device 10 for reptiles or amphibians is disclosed. The present feeding device 10 provides a new way of feeding your reptiles or amphibians. The present feeding device 10 may be utilized to feed reptiles or amphibians from above in a manner replicating their natural environment and feeding habits. The present feeding device 10 allows reptiles or amphibians to use their instinct to hunt and forage for food. The present feeding device 10 is transparent allowing your reptiles or amphibians to see the live mealworms held within the feeding device 10. This attracts the reptiles and amphibians to the feeding device 10 and elicits natural hunting behaviors.

The present feeding device 10 provides enrichment as the reptile or amphibian watches the mealworms slowly crawl out of feeding holes 12 in the bottom 14 of the feeding device 10.

In practice, a user removes the feeding device 10 from its shipping packaging and rinses the feeding device 10 under clean water. The user then dries the feeding device 10 with a clean cloth or paper towel. The feeding device 10 is then secured to the vertical wall 16 of a habitat or terrarium 18 at a desired height using an attachment means. A clean food dish 22 is then placed directly under the feeding device 10 to prevent reptiles or amphibians from eating mealworms directly on the substrate or floor of the habitat or terrarium 18 as accidental substrate ingestion can cause impaction in the intestines and lead to death of the reptile or amphibian. Where it is desired to have the reptiles or amphibians eat from the clean food dish 22 after the mealworms have fallen from the feeding device 10, the feeding device 10 is secured to the vertical wall 16 of the habitat or terrarium 18 at a high position above the clean food dish 22 beyond the reach of the reptiles or amphibians. This allows the mealworms to fall into the food dish 22 while the reptiles or amphibians watch and wait. Where it is desired to have the reptiles or amphibians eat directly from the bottom 14 of the feeding device 10, the feeding device 10 is positioned lower upon the vertical wall 16 within the reach of the reptiles or amphibians such that the reptiles or amphibians may access the mealworms as they exit the feeding holes 12 formed in the bottom 14 of the feeding device 10. It is appreciated that the present feeding device 10 is designed for use with live mealworms available at a variety of pet stores.

Referring now to FIGS. 1 to 4, the feeding device 10 in accordance with the present invention is disclosed. The feeding device 10 includes a food chamber 24 in the form of a cup with a plurality of feeding holes formed in a bottom 14 thereof. The preferred hole size is 4 mm to accommodate the mealworm. The feeding device 10 is made from transparent plastic allowing reptile or amphibians sitting beneath the feeding device 10 to see the mealworms contained therein.

Alternatively, the feeding device can be colored or can take the appearance of a natural object like stone or wood according to the desired aesthetic of the reptile or amphibian owner. In this case, the worms do not become visible until they begin to crawl out of the holes in the bottom of the feeding device.

More particularly, the food chamber 24 is composed of a support surface 26 having an outer edge 28. In accordance with a preferred embodiment, the support surface 26 is disk shaped and, therefore, includes a substantially circular circumferential edge 28 about which is formed a side retaining wall 30. The side retaining wall 30 preferably has a height of approximately 1.625 inches (1⅝") inches to prevent mealworms from climbing over the side retaining wall 30 after they have been placed in the feeding device 10. The support surface 26 is provided with a plurality of feeding holes 12 that, as will be appreciated based upon the detailed description regarding use of the present feeding device 10, allows for the passage of mealworms therethrough.

Secure attachment of the feeding device 10 to the vertical wall 16 of a habitat or terrarium 18 or other supporting surface in which the reptile or amphibians might be housed is provided by the provision of a mounting bracket 32 with a suction cup 20 extending laterally therefrom. Additional means of attachment may be used; for example, Velcro with adhesive backing stuck on the back of the mounting bracket and also to the vertical wall of the habitat or terrarium, or a hook can be mounted/screwed to the vertical wall of the terrarium allowing the feeder to be hung from the hook using the hole on the mounting bracket.

The mounting bracket 32 is substantially L-shaped and includes a first bracket member 34 lying in a first plane and a second bracket member 36 lying in a second plane, which is substantially perpendicular to the first plane.

In accordance with a preferred embodiment, the top edge 38 of the side retaining wall 30 lies in the first plane and the first bracket member 34 extends from the top edge 38 of the side retaining wall 30 in a direction away from the center of the food chamber 24. Reinforcing members 40 are secured between the side retaining wall 30 and the first bracket member 34 to ensure the first bracket member 34 is adequately supported as it extends away from the side retaining wall 30.

While the first end 42 of the first bracket member 34 is coupled to the side retaining wall 30, the second bracket member 36 is secured at the second end 44 of the first bracket member 34 such that the second bracket member 36 is radially spaced from the side retaining wall 30. This relative positioning of the food chamber 24 and the second bracket member 36 allows for positioning of the food chamber 24 a spaced distance from a vertically wall 16 of a habitat or terrarium 18 in which a reptile or amphibian is housed.

The second bracket member 36 is provided with a suction cup 20 selectively mounted within a receiving slot 46 formed along the body 48 of the second bracket member 36. The suction cup 20 is oriented such that when it is secured to the vertical wall 16 of the habitat or terrarium 18, the second plane in which the second bracket member 36 lies is substantially parallel to the vertical wall 16 of the habitat terrarium 18 and the first plane in which the first bracket member 34 and the top edge 38 of the side retaining wall 30 lie is substantially perpendicular to the vertical wall 16 of the habitat or terrarium 18.

As mentioned above the support surface 26 of the food chamber 24 is substantially disc shaped. The support surface 26 includes a top surface 47 within the interior cavity defined by the support surface 26 and the side retaining wall 30. The support surface 26 also includes a bottom surface 48, which faces downwardly when the feeding device 10 is properly secured to a vertical wall 16 of the terrarium 18. As will be appreciated based upon the following disclosure, the support surface 26 is preferably formed with a slight convex configuration such that top surface 47 is crowned in a manner forcing mealworms toward the holes in the outer periphery of the support surface 26 and to the junction of the support surface 26 and the side retaining wall 30. A preferred crowning of approximately 5/16" (0.3125 inches) is preferred It is along the juncture of the support surface 26 and the side retaining wall 30 that the feeding holes 12 are formed. The feeding holes 12 are preferably formed in the support surface 26 in a circular configuration adjacent to the side retaining wall 30. The feeding holes 12 are of a size sufficient to permit the mealworms to pass through one at a time.

As briefly discussed, the feeding device 10 is used in the feeding of reptile or amphibians maintained in a terrarium. After the feeding device 10 has been removed from the packaging, assembled and cleaned, the feeding device 10 is secured to the vertical wall 16 of the terrarium 18 at a desired height using the suction cup 20 provided with the feeding device 10. In particular, the suction cup 20 is pressed against the vertical wall 16 with the food chamber 24 extending vertically downward therefrom with the second plane in which the second bracket member 36 lies substantially parallel to the vertical wall 16 of the terrarium 18 and the first plane in which the first bracket member 34 and the top edge 38 of the side retaining wall 30 lie is substantially perpendicular to the vertical wall 16 of the habitat or terrarium 18. The open side of the food chamber 24 faces upwardly in this configuration allowing for mealworms to be placed within the cavity defined by the support surface 26 and the side retaining wall 30.

The feeding device 10 may be placed on the vertical wall 16 of the habitat or terrarium 18 in a position allowing the reptile or amphibian to directly access the mealworms when they pass through the feeding holes 12 or at a high position requiring that the reptile or amphibian wait for the mealworms to fall from the feeding holes 12 onto a food dish 22 positioned beneath the feeding device 10.

Where it is desired that the reptile or amphibian eat from a food dish 22, the feeding device 10 is secured to the vertical wall 16 of the habitat or terrarium 18 at a high position beyond the reach of the reptiles or amphibians and above the clean food dish 22. This allows the mealworms to fall into the dish 22 while the reptile or amphibians watch and wait. Where it is desired to have the reptile or amphibians eat directly from the bottom 14 of the feeding device 10, the feeding device 10 is positioned lower upon the vertical wall 16 such that the reptile or amphibians may access the mealworms as they exit the feeding holes 12 formed in the bottom 14 of the feeding device 10.

With the feeding device 10 properly secured to the vertical wall 16 of the habitat or terrarium 18, the mealworms are placed within the food chamber 24 and the mealworms work their way through the feed holes 12 and out the bottom 14 of the feeding device 10.

Figure 5:
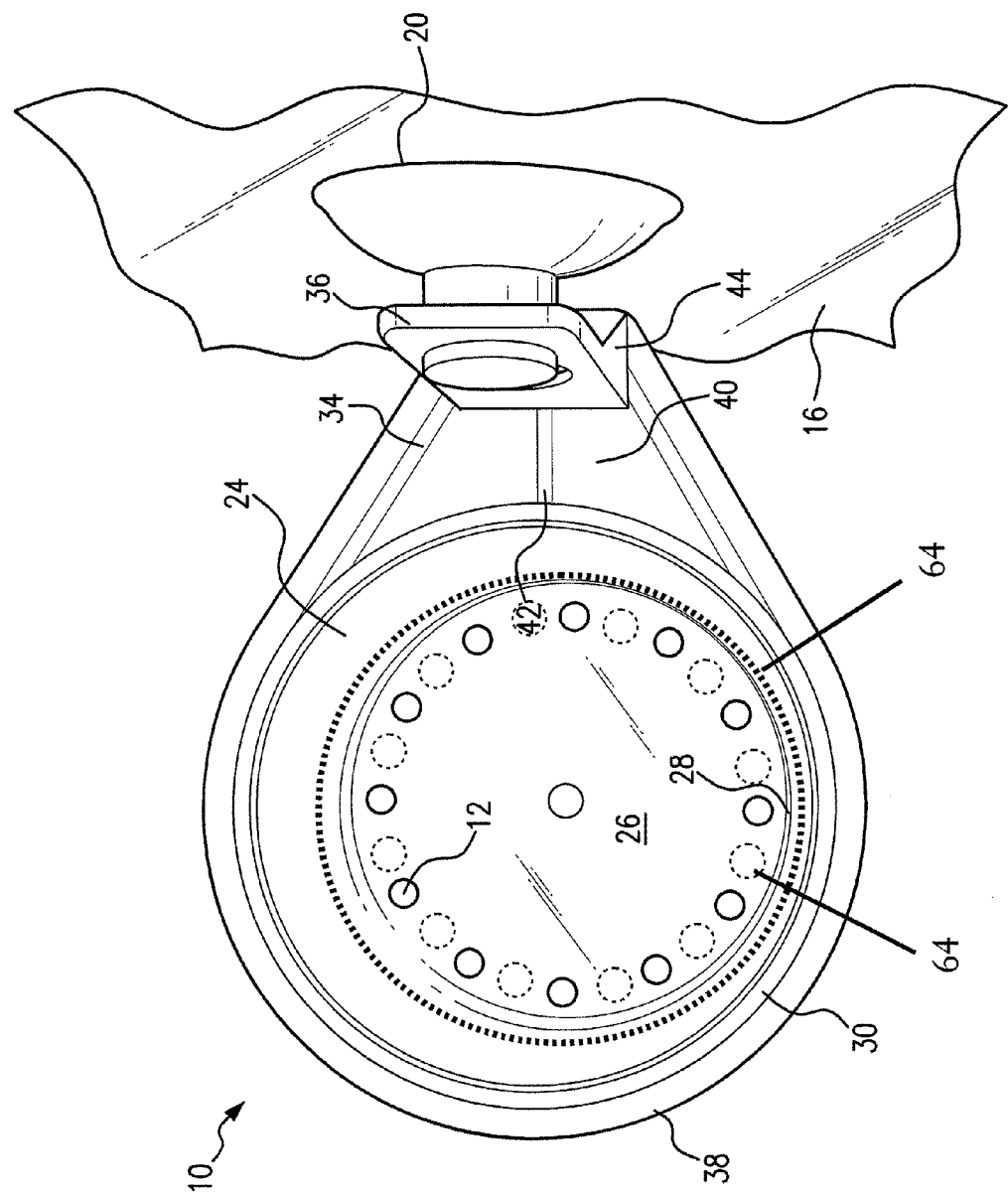
FIGS. 5 and 6 are respectively a top view and a side perspective view of an alternate embodiment of a feeding device in accordance with the present invention.
Figure 6:
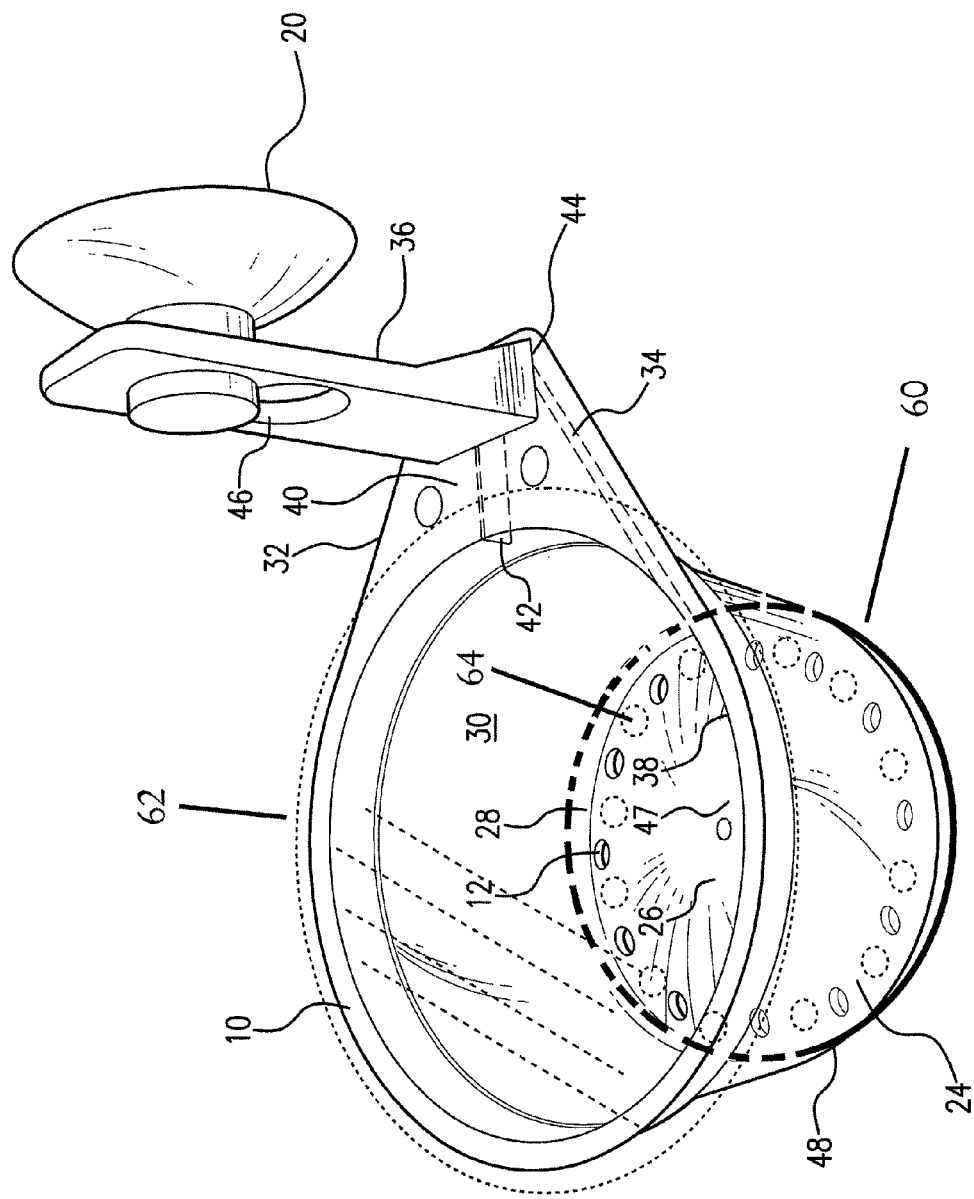

In accordance with an alternate embodiment as shown with reference to FIGS. 5 and 6, also contemplated is the use of a rotating disk 60 on the bottom of the cup 26 to selectively cover or block some or all of the access holes 12 for the mealworms. This embodiment would allow one to adjust the number and frequency of mealworms crawling out of the holes 12, or even block them off completely thereby making the cup an elevated feeding dish for reptiles or amphibians that can climb terrarium walls, like geckos and frogs. The rotating disk 60 will have holes 64 selectively placed thereon to block some or all of the holes 12 on the cup 26. Additionally, a lid 62 for the cup can be used to prevent animals from climbing into the cup and eating the worms. Further, the cup could also employ the use of a magnet for surfaces that do not allow adherence of suction cups.

Alternatively, the feeder can include a lip to prevent amphibians or reptiles from crawling into the feeder from the top and eating too much food.

While the preferred embodiments have been shown and described, it will be understood that there is no intent to limit the invention by such disclosure, but rather, is intended to cover all modifications and alternate constructions falling within the spirit and scope of the invention.

The invention claimed is:
1. A feeding device for a reptile or amphibian, comprising:
a food chamber in the form of a cup with a plurality of feeding holes, the food chamber including a support surface having a top surface, a bottom surface and an outer edge about which is formed a side retaining wall, the feeding holes being formed in the support surface only in an outer periphery of the support surface, and entirely along the outer periphery and along a juncture of the support surface and the side retaining wall, and wherein the support surface is formed in a convex con- figuration such that the support surface is crowned with a center point of the support surface above the outer edge of the support surface; and a mounting bracket extending from an upper edge of the side retaining wall and laterally from the food chamber.

2. The feeding device according to claim 1, wherein the support surface is round and the outer edge is a circular circumferential edge.

3. The feeding device according to claim 1, wherein the side retaining wall has a height of approximately 1.625 inches.

4. The feeding device according to claim 1, wherein the mounting bracket is substantially L-shaped and includes a first bracket member lying in a first plane and a second bracket member lying in a second plane which is substantially perpendicular to the first plane.

5. The feeding device of claim 4, wherein the mounting bracket has a suction cup extending therefrom.

6. The feeding device according to claim 5, wherein the second bracket member is provided with the suction cup selectively mounted within a receiving slot.

7. The feeding device according to claim 1, wherein the support surface has a crowning of approximately 0.3125 inches.

8. The feeding device according to claim 1, wherein the feeding device is made from a substantially transparent material.

9. The feeding device according to claim 1, further comprising a rotating disk attached to a bottom of the cup to selectively cover or block at least one of the plurality of feeding holes.

10. The feeding device according to claim 9, wherein the rotating disk has at least one hole that aligns with the plurality of the feeding holes in the food chamber in the form of the cup.

* * * * *